Patented Aug. 25, 1925.

1,551,428

UNITED STATES PATENT OFFICE.

LAWRENCE V. REDMAN AND HAROLD C. CHEETHAM, OF CHICAGO, ILLINOIS, ASSIGNORS TO BAKELITE CORPORATION, OF NEW YORK, N. Y., A CORPORATION OF DELAWARE.

PAPER PRODUCT AND PROCESS OF MAKING THE SAME.

No Drawing.   Application filed February 23, 1923.   Serial No. 620,823.

*To all whom it may concern:*

Be it known that we, (1) LAWRENCE V. REDMAN and (2) HAROLD C. CHEETHAM, citizens of the United States, residing at (1) Chicago, (2) Chicago, in the County of (1) Cook, (2) Cook, and State of (1) Illinois, (2) Illinois, have invented certain new and useful Improvements in Paper Products and Processes of Making the Same, of which the following is a specification.

This invention relates to paper or paperlike products (card-board, pulp-board, composite or laminated products etc. etc.) comprising organic or inorganic fibers and a phenolic resin. Products of this general nature have been heretofore made, as disclosed in the U. S. patents to Baekeland Nos. 1,160,362 and 1,160,365, by beating together the fiber in water suspension, and either phenols and formaldehyde, or equivalent substances, or their initial reaction products. The present invention comprises an improved process of this general type, and the improved product resulting therefrom.

According to the present invention in its preferred embodiment, the fiber in water suspension is beaten, for example in paper-beaters, or other suitable type of beating engine, with a mixture comprising as its essential components a phenol resin of the so-called permanently fusible and soluble type, otherwise known as a non-reactive phenol resin; a methylene-containing hardening agent, preferably hexamethylenetetramine; and a free phenolic body. For the best results it is necessary to observe certain precautions as to the proportioning of these several components; although as will appear hereinafter, there exist an indefinite number of proportions conforming to these general requirements, and the plasticity of the product can be varied at will to conform to special requirements.

The phenol resins, as preferably employed for the purposes of this invention, are of the hard, brittle, easily pulverizable non-reactive type, containing a greater or less proportion of free phenol. It is essential for securing the most desirable plasticity in the product that this free phenol should be retained by the resin during the beating operation. Water however will quickly eliminate free phenol from the finely powdered resin, and this reason we add to the water in the beater sufficient free phenol to effect its substantial saturation, thereby preventing it from extracting free phenol from the resin. From 5 to 8 percent of phenol or less, based on the weight of the water, will usually suffice, the amount varying of course with the temperature, with the particular kind of phenol or cresol employed, etc. The hardening agent, which is preferably hexamethylenetetramine, is used in sufficient proportion to unite with and harden the fusible resin, forming therewith in the first instance a potentially reactive composition; and in sufficient excess of such proportion to react with the phenol present in the resin and in the water, forming with this phenol either a non-reactive resin or a potentially reactive resin, according to the particular properties desired in the product, in which the non-reactive resin, if present, is capable of acting as a plasticizer.

A typical formula, to which however the invention is not limited, comprises 450 lbs. non-reactive phenol resin.
500 lbs. cotton or paper pulp.
7500 lbs. water.
375 lbs. commercial phenol.
240 lbs. hexamethylenetetramine.

The resin is first finely powdered, preferably to pass 100 mesh. The fiber may advantageously be a mixture of cotton flock and sulfite pulp, although any suitable fiber or fiber-mixture, including asbestos, may be used. The hexamethylenetetramine may be substituted wholly or in part by an equivalent proportion of formaldehyde or other aldehyde capable of hardening the resin and of reacting with the phenol. Other phenolic bodies may of course replace phenol.

We preferably add also in the beater a small proportion of any suitable "release material" or lubricant, preferably calcium stearate in powdered form.

The whole mass is now beaten to a homogeneous pulp after the manner of making paper and is then run onto the screens, applying such vacuum as will leave in the wet paper approximately one pound of water for each pound of dry paper. The paper may then be dried either by running through warm calendering rolls or by passing through a drying oven, care being taken in either case that the chemical reaction between the phenol resin, the phenol, and the hexamethylenetetramine or formaldehyde does not then proceed to the final reaction stage, but that the resin content of the paper remains potentially reactive. When the paper is used for making a laminated product, as described below, the final reaction occurs during the hot-pressure consolidation of the laminæ.

The paper may be prepared in any desired thickness, from 2/1000 inch or less up to one inch or more in thickness, all products prepared in this manner being herein designated as "paper".

The paper may be applied in any molding operation, as is well understood by those conversant with this art, being for example disintegrated by suitable means to form a molding mixture of general applicability. It is especially suited for the manufacture of laminated products, the superposed sheets, to the desired number, being consolidated by hot-pressure in the hydraulic press in the standard manner.

By varying the amounts of free phenol and free hexamethylenetetramine, or their equivalents, in the water solution, we are enabled to vary at will the viscosity of the resulting mass; the less phenol and hexamethylenetetramine used, the stiffer the mass and the less its flow. When further plasticity is desired, it may be obtained by adding furfural, say in the proportion of 10–15 per cent of the mass. This by reason of its aldehyde nature may also act as a hardener in the final transformation of the resin.

On account of the considerable content of phenol and hexamethylenetetramine in the water, as well as of furfural when this is employed, it is desirable to use the water vehicle over and over, keeping a simple analytical control of the solution. By reason of the low vapor tension of phenol, furfural and hexamethylenetetramine, and because of the fact that the beating and paper-laying operations may be carried out at about room temperatures, there is practically no loss of these materials by evaporation.

It will be understood that as the wet paper leaves the screens its water content is charged with phenol and hexamethylenetetramine, as well as with furfural, if used; and since these components, or their reaction products, are left as a residue in the dried paper, it is important to exercise adequate control of the water content of the paper as it leaves the screen. The plasticity of the mass may be controlled by varying this water content, since the ratio of fiber is thereby controlled. As above stated, a convenient practical rule when using ingredients in the proportions mentioned above is so to apply the vacuum that there remains in the paper as it passes from the screens to the calender rolls, approximately one pound of water for each pound of total solids.

Our invention is not restricted to the particular materials, proportions and manipulations above detailed. For example, the non-reactive phenol resin and the methylene hardening agent together constitute a potentially reactive resin composition, and these components may be substituted, wholly or in part, by potentially reactive phenolic resins otherwise prepared, as for example those initial phenolic condensation products which are directly transformable by heat into the infusible final product. The term "potentially reactive phenolic resin composition" is used herein to include these various equivalents.

We claim:

1. Process comprising compounding a fibrous material, a non-reactive phenol resin, and a hardening agent for said resin, in presence of water containing a free phenolic body.

2. Process comprising compounding a fibrous material and a potentially reactive phenolic resin composition in presence of water substantially saturated with a free phenolic body.

3. Process of making a paper product, comprising compounding a fibrous material and a potentially reactive phenolic resin composition in presence of water containing a free phenolic body, and laying the resulting pulp into a sheet.

4. Process according to claim 2 in which the potentially reactive phenolic resin composition comprises a permanently fusible phenol resin and hexamethylenetetramine.

5. Process according to claim 2 in which the potentially reactive phenolic resin composition comprises a non-reactive phenol resin and a plurality of hardening agents therefor.

6. Process according to claim 2 in which the potentially reactive phenolic resin composition comprises a non-reactive phenol resin, hexamethylenetetramine and furfural.

7. Process of making a paper product, comprising compounding a fibrous material and a phenolic resin in presence of a free phenol and a methylene compound in aqueous solution, laying the resulting pulp into paper, separating from the paper a controlled proportion of the aqueous solution, and utilizing said solution in a repetition of the pulp-making process.

8. Process comprising compounding in presence of water a fibrous material, and a potentially reactive phenolic resin composition comprising furfural.

9. A paper product comprising in sheet form a fibrous material, and a potentially reactive phenolic resin composition comprising a non-reactive phenol resin, a free phenol, and a methylene hardening agent.

10. A paper product comprising in sheet form a fibrous material, and a potentially reactive phenolic resin composition comprising a non-reactive phenol resin, a free phenol, and a methylene hardening agent. said hardening agent proportioned to react with the free phenol and the phenol resin.

11. A paper product comprising in sheet form a fibrous material, and a potentially reactive phenolic resin composition comprising a non-reactive phenol resin and a hardening agent therefor including furfural.

12. A paper product comprising in sheet form a fibrous material, and a potentially reactive phenolic resin composition comprising a non-reactive phenol resin and a hardening agent therefor including hexamethylenetetramine and furfural.

13. Process of making a laminated product, consisting in superposing a plurality of sheets each comprising a fibrous material, a non-reactive phenol resin, free phenol, and a methylene hardening agent; and uniting and consolidating the sheets by a hot-pressing operation.

14. Process of making a laminated product, consisting in superposing a plurality of sheets each comprising a fibrous material, a non-reactive phenol resin, and a hardening agent comprising furfural; and uniting and consolidating the sheets by a hot-pressing operation.

15. Process of making a laminated product, consisting in superposing a plurality of sheets each comprising a fibrous material, a non-reactive phenol resin, and a hardening agent comprising hexamethylenetetramine and furfural; and uniting and consolidating the sheets by a hot-pressing operation.

In testimony whereof, we affix our signatures.

LAWRENCE V. REDMAN.
HAROLD C. CHEETHAM.